United States Patent
Calvanese Strinati et al.

(10) Patent No.: US 11,706,291 B2
(45) Date of Patent: Jul. 18, 2023

(54) CONTROL OF OFFLOADING OF CALCULATION TASKS IN MULTI-ACCESS EDGE COMPUTING

(71) Applicant: COMMISSARIAT A L'ENERGIE ATOMIQUE ET AUX ENERGIES ALTERNATIVES, Paris (FR)

(72) Inventors: Emilio Calvanese Strinati, Grenoble (FR); Serge Bories, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/340,689

(22) Filed: Jun. 7, 2021

(65) Prior Publication Data

US 2021/0385271 A1 Dec. 9, 2021

(30) Foreign Application Priority Data

Jun. 8, 2020 (FR) ..................... 20 05951

(51) Int. Cl.
*H04L 67/1036* (2022.01)
*H04L 67/1008* (2022.01)
(Continued)

(52) U.S. Cl.
CPC ........ *H04L 67/1036* (2013.01); *H04L 67/101* (2013.01); *H04L 67/1008* (2013.01); *H04L 67/1031* (2013.01)

(58) Field of Classification Search
CPC ............. H04L 67/1036; H04L 67/1008; H04L 67/101; H04L 67/1031; H04B 1/3838;
(Continued)

(56) References Cited

U.S. PATENT DOCUMENTS 10,812,125 B1 * 10/2020 Badic .................. H04B 7/0408
2015/0261274 A1 * 9/2015 Ahnn ..................... G06F 1/3212
713/340
(Continued)

FOREIGN PATENT DOCUMENTS

WO   WO-2013190410 A1 * 12/2013 ........... H04B 1/3838

OTHER PUBLICATIONS

Yichuan WANG., et al.,"An energy saving based on task migration fo rmobile edge computing",EURASIP Journal On Wireless Communicationsand Networking, vol. 2019, No. 1, May 27, 2019, 10pages (Year: 2019).*

(Continued)

*Primary Examiner* — Kevin T Bates
*Assistant Examiner* — Ranjan Pant
(74) *Attorney, Agent, or Firm* — Oblon, McClelland, Maier & Neustadt, L.L.P.

(57) ABSTRACT

Method for offloading calculation tasks between a user terminal and an edge host device in a communication network according to a multi-access edge computing technique, including steps of: Offloading data necessary for the execution of the calculation from the user terminal to the edge host device, and Transmitting data resulting from the calculation carried out by the edge host device, from the edge host device to the user terminal, wherein the offloading of data is controlled on the basis of joint criteria of energy efficiency and of minimization of exposure of a user of the user terminal to electromagnetic fields.

12 Claims, 1 Drawing Sheet

US 11,706,291 B2

Page 2

(51) Int. Cl.
*H04L 67/101* (2022.01)
*H04L 67/1031* (2022.01)

(58) Field of Classification Search
CPC .. G06F 2209/509; G06F 9/5027; Y02D 10/00
See application file for complete search history.

(56) References Cited

U.S. PATENT DOCUMENTS

2016/0105854 A1* 4/2016 Lee .................. H04B 17/102
455/127.2
2020/0281035 A1* 9/2020 Di Pietro ............ H04B 17/318

OTHER PUBLICATIONS

U.S. Appl. No. 16/802,630, filed Feb. 27, 2020, 2020/0281035 A1, Di Pietro, et al.
French Preliminary Search Report dated Mar. 7, 2021 in French Application 20 05951 filed on Jun. 8, 2020 (with English Translation of Categories of Cited Documents), 2 pages.
Yichuan Wang., et al., "An energy saving based on task migration for mobile edge computing", EURASIP Journal on Wireless Communications and Networking, vol. 2019, No. 1, May 27, 2019, 10 pages.
Pavel Mach, et al., "Mobile Edge Computing: A Survey on Architecture and Computation Offloading", IEEE Communications Surveys & Tutorials, Jan. 1, 2017, 28 pages.

* cited by examiner

CONTROL OF OFFLOADING OF CALCULATION TASKS IN MULTI-ACCESS EDGE COMPUTING

TECHNICAL FIELD

The present invention relates to a field combining computing and communication networks. More precisely, it relates to the field of multi-access edge computing, called MEC. It relates more particularly to the control of offloading of calculation tasks in multi-access edge computing.

PRIOR ART

The offloading of calculation tasks from a user terminal to the cloud is considered to be an effective solution for limiting the computing energy consumption of the user terminal and for respecting the latency constraints of the process including the communication and the calculation strictly speaking. Nevertheless, the offloading of calculation tasks leads to the generation of an additional communication load both on the upstream link and on the downstream link: the offloading traffic.

The corresponding communication costs depend on a certain number of parameters, including the propagation conditions, the bitrate that must be ensured, the antenna gains in emission and in reception, as well as the distance between the user terminal and a radio base station that receives the data. Moreover, the communication times can be significant. Phenomena of congestion of the backhaul network can occur, for example if a large number of users operate in the same geographic zone.

To solve these problems, multi-access edge computing proposes using the calculation and data-processing capacities of devices at the edge of the network called mobile edge hosts (or MEH).

Multi-access edge computing offers application developers and content providers cloud computing capacities and a computer service environment on the edge of the network. This environment is characterized by very low constraints on the latency, a high bitrate and real-time access to the information of the radio network that can be used by the applications. MEC technology allows operators to deploy innovative applications and services to the user terminals in a flexible and rapid manner.

The article by P Mach and Z Becvar entitled "Mobile edge computing: A survey on architecture and computation offloading", published in IEEE Communications Surveys & Tutorials 19 (3), p. 1628-1656, provides a review of the techniques implemented in multi-access edge computing, which was formerly called mobile edge computing.

Moreover, the European Telecommunications Standards Institute (ETSI) standardized MEC technology.

The decision to offload calculation tasks from a user terminal to a server at the edge of the network is carried out according to criteria, among which the main ones are the minimization of energy consumption in the user terminal and the respect of an acceptable execution time for the offloaded tasks.

However, the communications related to the offloading of calculation tasks also lead to an increase in the electromagnetic fields emitted at the user terminal.

DISCLOSURE OF THE INVENTION

The invention aims to resolve the problems of the prior art by providing a method for offloading calculation tasks between a user terminal and an edge host device in a communication network according to a multi-access edge computing technique, including steps of:

Offloading data necessary for the execution of the calculation from the user terminal to the edge host device, and Transmitting data resulting from the calculation carried out by the edge host device, from the edge host device to the user terminal.

The offloading of data is controlled on the basis of criteria of energy efficiency and minimization of exposure of a user of the user terminal to electromagnetic fields. A value of exposure of the user to electromagnetic fields is calculated according to one or more of the following criteria:

a measurement of momentary radiofrequency electromagnetic dosimetry or a cumulative dose over a time window, the exposure to electromagnetic fields on the basis of specific exposure maps, and a sum of exposure of the user or of an identified group of people to electromagnetic fields, this exposure being caused by the user terminal or by other sources of electromagnetic fields close to the user terminal.

Via the invention, the communication and calculation resources are managed jointly with the exposure of the users to electromagnetic fields, which allows a holistic management of the resources and of the state of exposure of the users to electromagnetic fields.

According to a preferred feature, the method for offloading calculation tasks includes steps of:

Classifying a set of calculation tasks into a subset of offloadable tasks and a subset of non-offloadable tasks, according to technical characteristics of the calculation tasks, Identifying the tasks for which offloading is necessary, according to technical characteristics of the user terminal, Estimating, for each task of the subset of offloadable tasks, whether the offloading of the task presents an advantage according to a constraint of latency and a reduction of the power associated with the offloading rather than with the calculation on the user terminal, and Determining whether the offloading can be carried out while respecting the criterion of minimization of exposure of the user to electromagnetic fields.

According to a preferred feature, the measurement of radiofrequency electromagnetic dosimetry is based on:

A transmission power established to ensure that a link between the user terminal and the edge host device is not interrupted, and A distance between the body of the user and an emission/reception device of the user terminal.

According to a preferred feature, the distance between the body of the user and the emission/reception device of the user terminal is evaluated on the basis of data provided by at least one out of a proximity sensor, an inertial measurement unit, a touch screen provided in the user terminal or by a monitoring of adaptation of impedance of various antennas provided in the user terminal.

According to a preferred feature, an instantaneous value of exposure of the user to electromagnetic fields is determined.

According to an alternative preferred feature, a cumulative value over a time window of exposure of the user to electromagnetic fields is determined.

The invention also relates to a controller of offloading of calculation tasks between a user terminal and an edge host device in a communication network according to a multi-access edge computing technique, the user terminal and the edge host device being adapted to:

Offload data necessary for the execution of the calculation from the user terminal to the edge host device, and Transmit data resulting from the calculation carried out by the edge host device, from the edge host device to the user terminal.

The controller of offloading of calculation tasks is adapted to control the offloading of data on the basis of criteria of energy efficiency and minimization of exposure of a user of the user terminal to electromagnetic fields. It is adapted to calculate a value of exposure of the user to electromagnetic fields according to one or more of the following criteria:

a measurement of momentary radiofrequency electromagnetic dosimetry or a cumulative dose over a time window, the exposure to electromagnetic fields on the basis of specific exposure maps, and a sum of exposure of the user or of an identified group of people to electromagnetic fields, this exposure being caused by the user terminal or by other sources of electromagnetic fields close to the user terminal.

The invention also relates to a user terminal including a controller of offloading of calculation tasks as presented above.

The offloading controller and the user terminal have advantages analogous to those presented above.

In a specific embodiment, the steps of the method according to the invention are implemented by computer program instructions.

Consequently, the invention is also aimed at a computer program on an information carrier, this program being capable of being implemented in a computer, this program including instructions adapted to the implementation of the steps of a method as described above.

This program can use any programming language, and be in the form of source code, object code, or intermediate code between source code and object code, such as in a partially compiled form, or in any other desirable form.

The invention is also aimed at an information carrier readable by a computer, and including computer program instructions adapted to the implementation of the steps of a method as described above.

The information carrier can be any unit or device capable of storing the program. For example, the carrier can include a storage medium, such as a ROM, for example a CD-ROM or a microelectronic circuit ROM, or a magnetic recording medium, for example a floppy disk or a hard disk.

Moreover, the information carrier can be a transmittable carrier such as an electric or optical signal, which can be delivered via an electric or optical cable, by radio or by other means. The program according to the invention can be in particular downloaded over a network of the Internet type.

Alternatively, the information carrier can be an integrated circuit into which the program is incorporated, the circuit being adapted to execute or to be used in the execution of the method according to the invention.

BRIEF DESCRIPTION OF THE DRAWINGS

Other features and advantages will become apparent upon reading the following description of a preferred embodiment, given as a non-limiting example, described in reference to the drawings in which.

Figure 1:
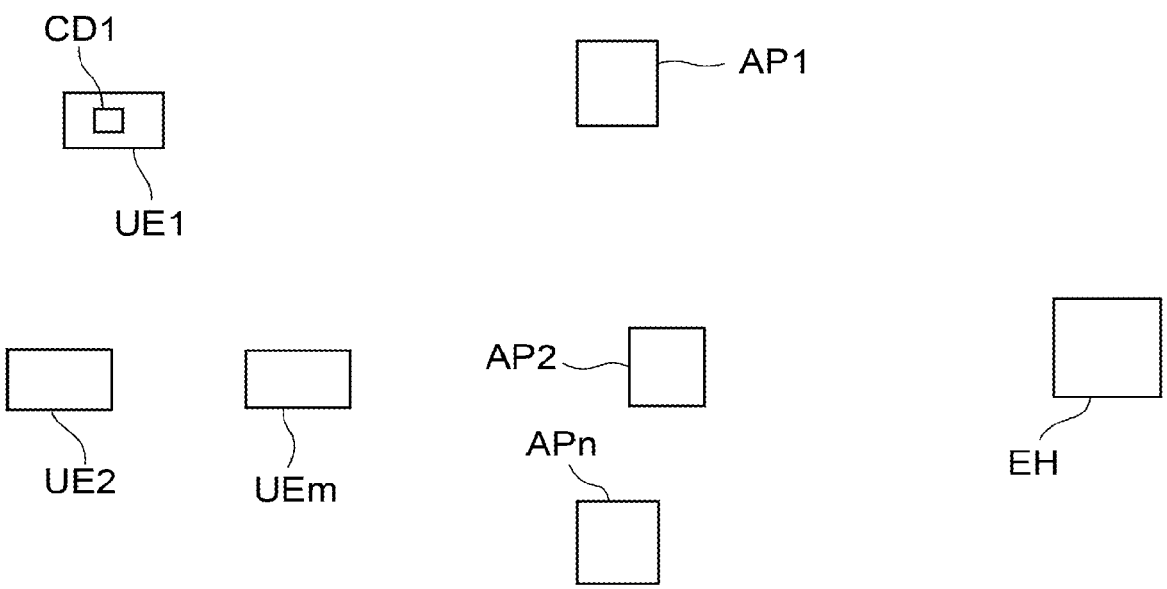
FIG. 1 illustrates a communication network in which an offloading of calculation tasks is implemented, according to an embodiment of the invention.

The various parts shown in the drawings are not necessarily on the same scale, to make the drawings more readable.

The various possibilities (alternatives and embodiments) must be understood as not being exclusive of each other and can be combined with each other.

DETAILED DISCLOSURE OF SPECIFIC EMBODIMENTS

According to a preferred embodiment, shown in FIG. 1, a communication network includes a set of devices adapted to communicate and more particularly communicate according to the principle of multi-access edge computing, called MEC.

Thus, the communication network includes, schematically, user terminals UE1, UE2, . . . UEm, where m is an integer, which are in particular mobile telephones or smart apparatuses called "IoT" (for Internet of Things) that can be connected according to the techniques grouped together under the name internet of things. The IoT devices are industrial or domestic devices, such as sensors, actuators and other input/output components, capable of collecting data or carrying out actions on the basis of a real environment.

The user terminals are capable of being connected to access points AP1, AP2, . . . APn, where n is an integer, of an access network. The access network allows connections of the user terminals to a core network. However, here, connections and transmissions of data between the user terminals and one or more edge host device EH, or edge computer servers, which are closer to the user terminals than the core network are considered. A single edge host device EH was shown in FIG. 1 but of course the number thereof can be greater.

The edge host devices are for example located in the access network. They can thus be at the same location as the access points. Alternatively, they can be at other locations; an additional link is thus necessary, for example in a backhaul network.

Of course, the technique and the devices implemented vary according to the types of network: 4G, 5G, 6G, for example.

For the implementation of multi-access edge computing, a controller of offloading of calculation tasks is provided in each user terminal UE1, UE2, . . . UEm. A single controller of offloading of calculation tasks CD1 was shown in FIG. 1. Alternatively, the offloading controller is in the access network, for example in the edge host device. While the offloading controller is in the access network, signaling information relative to the control of access is exchanged between it and the user terminals.

The function of the offloading controller is to plan if, when and how the offloading of calculation tasks between a user terminal and an edge host device is carried out. As detailed below, the offloading controller according to the invention determines in particular the emission power and the specific directivity of the antennas of the user terminal.

The offloading controller dialogues with an orchestrator located in the network and as defined by the aforementioned ETSI standard. The orchestrator controls in particular whether an offloading of calculation tasks with requested performance is possible for the network.

The offloading of calculation tasks from a user terminal to an edge host device includes the following phases:
- signaling to identify the target of the offload request and request to the orchestrator of the MEC to be able to access such a service. In this phase, the quality of service parameters, called QoS, are negotiated and granted;
- communication, during which the bits necessary for the execution of the calculation are transmitted, or offloaded, from the user terminal to an access point then to the edge host device;
- calculation, during which the bits are processed by the edge host device; this phase can include the setting up of ad hoc local clusters to bring together calculation units or cache resources; and
- communication, in which the results of the execution of the offloaded calculation task are retransmitted from the edge host device to the user terminal, or optionally to one or more other user terminals.

The controller of offloading of calculation tasks is adapted to carry out the control of offloading in the following manner.

The controller of offloading of calculation tasks first considers a set of calculation tasks and classifies them into a subset of offloadable tasks and a subset of non-offloadable tasks, according to technical characteristics of the calculation tasks.

The technical characteristics of a calculation task that are taken into account are for example the hardware dependence of the calculation of the task or a data dependence between instructions.

The controller of offloading of calculation tasks then identifies the tasks for which offloading is necessary, according to technical characteristics of the user terminal.

The offloading of a task is considered to be necessary when the local calculation of the task is costly or impossible. This decision is based on a series of tests taking into account the calculation capacity of the user terminal, the memory needs and the mobile battery consumption. A task is classified as "should be offloaded" if one of the following conditions is met:
- The level of the battery of the user terminal is critical,
- The memory required for the task is greater than the authorized percentage of the available memory on the user terminal,
- The task requires a calculation capacity greater than a predefined percentage of the total available capacity on the user terminal,
- The task requires software that is not present in the user terminal,
- The task requires data that is not present in the user terminal.

It should be noted that the offloading thresholds defined above are parameters that can be defined by the user via the mobile device operating system.

The controller of offloading of calculation tasks then estimates, for each task of the subset of offloadable tasks, whether the offloading of the task presents an advantage according to a latency constraint and a reduction of the power associated with the offloading rather than with the calculation on the user terminal.

The result of this estimation includes a set of information:
- the estimation of the characteristics of the offloading traffic such as the intensity of the traffic, the periodicity, the time constraints, the size of the generation of offloading packets to be sent to the edge host device (packet size on the upstream link) and, in certain cases, the size of MEC packets received on the downstream link from the edge host device,
- the estimation of the radiofrequency transmission power from the user terminal to the access point for the offloading of the calculation task, and
- the antenna diagram for the communication from the user terminal to the access point.

Conjointly with the estimation of the advantage of offloading a calculation task, the controller of offloading of calculation tasks estimates whether the offloading of the calculation task can be carried out while respecting a criterion related to the exposure of the user to electromagnetic fields. It is sought to minimize the exposure of a user of the user terminal to electromagnetic fields.

A value of exposure of the user to electromagnetic fields is calculated according to one or more of the following criteria:
- a measurement of momentary radiofrequency electromagnetic dosimetry or a cumulative dose over a time window,
- the exposure to electromagnetic fields on the basis of specific exposure maps, and
- a sum of exposure of the user or of an identified group of people to electromagnetic fields, this exposure being caused by the user terminal or by other sources of electromagnetic fields close to the user terminal.

The measurement of radiofrequency electromagnetic dosimetry is based both on the distance between the user and an emitter/receiver device of the user terminal and on the power transmitted by the user terminal for the offloading of calculation tasks.

The distance between the body of the user and the emission/reception device of the user terminal is related to a coupling of electromagnetic energy between the body of the user and the emission/reception device of the user terminal. This coupling depends on the antenna diagram of the antenna of the user terminal.

The distance between the user and the emitter/receiver device of the user terminal is thus determined. For this, it is possible to use a proximity sensor, an inertial measurement unit, the man-machine interface of the user terminal or the touch screen of the user terminal. During its use, the touch screen allows to know where the fingers are with respect to the terminal and thus allows to direct the emission to the antennas that minimize the electromagnetic exposure of the user. The analysis of all of the data of these sensors allows to refine the positioning of the body of the user with respect to the terminal, given that certain parts of the body are more critical (ex. head).

Another possibility for determining the physical distance between the user and the emitter/receiver device of the user terminal is to monitor the adaptation of impedance of the various antennas on the user terminal to evaluate the nearby context around the user terminal (manipulation, proximity of the head). Indeed, the dielectric material of the body of the user disturbs the nominal behavior of these antennas more as the distance between the user and the antennas decreases.

Once analyzed, all of this information produces an environment of nearby context and thus a status of use of the user terminal (web navigation, audio call at the ear, handling or apparatus not held) that are associated with a value of exposure of the user to electromagnetic fields.

The exposure of the user to electromagnetic fields is estimated on the basis of four pieces of information:
- the emission frequency band(s),
- the position of the body of the user with respect to the terminal, the radiofrequency power transmitted from the emission antenna, and the radiation pattern, especially if the latter can be reconfigured (case of the networks of antennas).

On the basis of this information in real time, the spatial distribution of the electromagnetic energy absorbed in the various parts of the human body is estimated, by also using models (coming from measurements or from simulations) in the form of a reference table in order to simply the calculation.

As already mentioned, the value of exposure of the user to electromagnetic fields is either an instantaneous value, or a cumulative value over a time window.

In both cases, the value of exposure of the user to electromagnetic fields is compared to a threshold value of exposure to electromagnetic fields expressing an exposure limit. The threshold value of exposure to electromagnetic fields can vary according to the users.

The result of the estimation whether the offloading of the calculation tasks can be carried out while respecting a criterion related to the exposure of the user to electromagnetic fields is one decision out of the following:

carrying out the offloading of the calculation task from the user terminal to the edge host device, carrying out the offloading of the calculation task from the user terminal to the edge host device, conditionally, and not carrying out the offloading of the calculation task over a given time window.

In the second case, the offloading is constrained to one or more conditions out of:

a) limiting the transmission power of the user terminal and thus reducing the capacity on the upstream link, b) carrying out a partial offloading and limiting the traffic data on the upstream link transmitted to the access point, c) carrying out a partial offloading and limiting the traffic data on the downstream link transmitted by the access point, d) cumulative conditions b+c, and e) adapting the radiation pattern of the antenna of the user terminal to reduce the exposure to electromagnetic fields for the user given a maximum exposure target (momentary or cumulative).

"Partial offloading" means an intermittent offloading of calculation tasks: a part of the calculations is carried out by the edge host device after offloading, and another part of the calculations is carried out by the user terminal.

Figure 2:
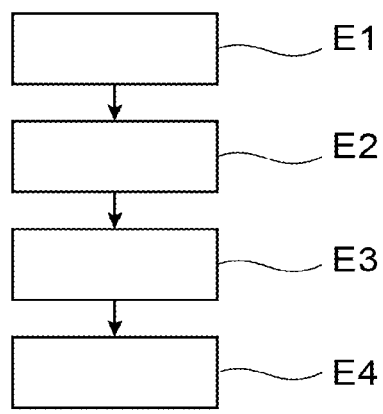
FIG. 2 illustrates a method for offloading calculation tasks, according to an embodiment of the invention.

FIG. 2 shows the operation of the offloading controller in the form of a method including steps E1 to E4. This method is part of a method for offloading calculation tasks between a user terminal and an edge host device in a communication network according to a multi-access edge computing technique, including the steps of:

Offloading data necessary for the execution of the calculation from the user terminal to the edge host device, Transmitting data resulting from the calculation carried out by the edge host device, from the edge host device to the user terminal.

These steps are known per se and will not be described in detail here.

The method for offloading calculation tasks is characterized in that the offloading of data is controlled on the basis of joint criteria of energy efficiency and minimization of exposure of a user of the user terminal to electromagnetic fields. It is therefore the control of the offloading of data that is described in detail below.

Step E1 is a classification of a set of calculation tasks into a subset of offloadable tasks and a subset of non-offloadable tasks, according to technical characteristics of the calculation tasks.

The technical characteristics of a calculation task that are taken into account are for example the hardware dependence of the calculation of the task or a data dependence between instructions.

The following step E2 is an identification of the tasks for which offloading is necessary, according to technical characteristics of the user terminal.

The offloading of a task is considered to be necessary when the local calculation of the task is costly or impossible. This decision is based on a series of tests taking into account the calculation capacity of the user terminal, the memory needs and the mobile battery consumption. A task is classified as "should be offloaded" if one of the following conditions is met:

The level of the battery of the user terminal is critical,

The memory required for the task is greater than the authorized percentage of the available memory on the user terminal, The task requires a calculation capacity greater than a predefined percentage of the total available capacity on the user terminal, The task requires software that is not present in the user terminal, The task requires data that is not present in the user terminal.

It should be noted that the offloading thresholds defined above are parameters that can be defined by the user via their mobile device operating system.

The following step E3 is an estimation to determine, for each task of the subset of offloadable tasks, whether the offloading of the task presents an advantage according to a constraint of latency and a reduction of the power associated with the offloading rather than with the calculation on the user terminal.

The result of this estimation includes a set of information:

the estimation of the characteristics of the offloading traffic such as the intensity of the traffic, the periodicity, the time constraints, the size of the generation of offloading packets to be sent to the edge host device (packet size on the upstream link) and, in certain cases, the size of MEC packets received on the downstream link from the edge host device, the estimation of the radiofrequency transmission power from the user terminal to the access point for the offloading of the calculation task, and the antenna diagram for the communication from the user terminal to the access point.

The following step E4 is an estimation to determine whether the offloading of the calculation task can be carried out while respecting a criterion related to the exposure of the user to electromagnetic fields. It is recalled that it is sought to minimize the exposure of a user of the user terminal to electromagnetic fields.

This estimation is carried out conjointly with the estimation of the advantage of offloading a calculation task.

A value of exposure of the user to electromagnetic fields is calculated according to one or more of the following criteria:

a measurement of momentary radiofrequency electromagnetic dosimetry or a cumulative dose over a time window, the exposure to electromagnetic fields on the basis of specific exposure maps, and a sum of exposure of the user or of an identified group of people to electromagnetic fields, this exposure being caused by the user terminal or by other sources of electromagnetic fields close to the user terminal.

The measurement of radiofrequency electromagnetic dosimetry is based both on the distance between the user and an emitter/receiver device of the user terminal and on the power transmitted by the user terminal for the offloading of calculation tasks.

The distance between the body of the user and the emission/reception device of the user terminal is related to a coupling of electromagnetic energy between the body of the user and the emission/reception device of the user terminal. This coupling depends on the antenna diagram of the antenna of the user terminal.

The physical distance between the user and the emitter/receiver device of the user terminal is thus determined. For this, it is possible to use a proximity sensor, an inertial measurement unit, the man-machine interface of the user terminal or the touch screen of the user terminal. During its use, the touch screen allows to know where the fingers are with respect to the terminal and thus allows to direct the emission to the antennas that minimize the electromagnetic exposure of the user. The analysis of all of the data of these sensors allows to refine the positioning of the body of the user with respect to the terminal, given that certain parts of the body are more critical (ex. head).

Another possibility for determining the physical distance between the user and the emitter/receiver device of the user terminal is to monitor the adaptation of impedance of the various antennas on the user terminal to evaluate the nearby context around the user terminal (manipulation, proximity of the head). Indeed, the dielectric material of the body of the user disturbs the nominal behavior of these antennas more as the distance between the user and the antennas decreases.

Once analyzed, all of this information produces an environment of nearby context and thus a status of use of the user terminal (web navigation, audio call at the ear, handling or apparatus not held) that are associated with a value of exposure of the user to electromagnetic fields.

The exposure of the user to electromagnetic fields is estimated on the basis of four pieces of information:
the emission frequency band(s),
the position of the body of the user with respect to the terminal,
the radiofrequency power transmitted from the emission antenna, and
the radiation pattern, especially if the latter can be reconfigured (case of the networks of antennas).

On the basis of this information in real time, the spatial distribution of the electromagnetic energy absorbed in the various parts of the human body is estimated, by also using models (coming from measurements or from simulations) in the form of a reference table in order to simplify the calculation.

As already mentioned, the value of exposure of the user to electromagnetic fields is either an instantaneous value, or a cumulative value over a time window.

In both cases, the value of exposure of the user to electromagnetic fields is compared to a threshold value of exposure to electromagnetic fields expressing an exposure limit. The threshold value of exposure to electromagnetic fields can vary according to the users.

The result of the estimation whether the offloading of the calculation tasks can be carried out while respecting a criterion related to the exposure of the user to electromagnetic fields is one decision out of the following:

carrying out the offloading of the calculation task from the user terminal to the edge host device,
carrying out the offloading of the calculation task from the user terminal to the edge host device, conditionally, and
not carrying out the offloading of the calculation task over a given time window.

In the second case, the offloading is constrained to one or more conditions out of:
a) limiting the transmission power of the user terminal and thus reducing the capacity on the upstream link,
b) carrying out a partial offloading and limiting the traffic data on the upstream link transmitted to the access point,
c) carrying out a partial offloading and limiting the traffic data on the downstream link transmitted by the access point,
d) cumulative conditions b+c, and
e) adapting the radiation pattern of the antenna of the user terminal to reduce the exposure to electromagnetic fields for the user given a maximum exposure target (momentary or cumulative).

"Partial offloading" means an intermittent offloading of calculation tasks: a part of the calculations is carried out by the edge host device after offloading, and another part of the calculations is carried out by the user terminal.

The invention claimed is:

1. A method for offloading calculation tasks between a user terminal and an edge host device in a communication network according to a multi-access edge computing technique, including steps of:
offloading data necessary for execution of the calculation from the user terminal to the edge host device, and
transmitting data resulting from the calculation carried out by the edge host device, from the edge host device to the user terminal, the offloading of data being controlled on the basis of a criterion of energy efficiency,
wherein the offloading of data is further controlled by a criterion of minimization of exposure of a user of the user terminal to electromagnetic fields, a value of exposure of the user to electromagnetic fields being calculated according to one or more of the following criteria:
a measurement of momentary radiofrequency electromagnetic dosimetry or a cumulative dose over a time window,
the exposure to electromagnetic fields on a basis of specific exposure maps, and
a sum of exposure of the user or of an identified group of people to electromagnetic fields, this exposure being caused by the user terminal or by other sources of electromagnetic fields close to the user terminal.

2. The method for offloading calculation tasks according to claim 1, including steps of
classifying a set of calculation tasks into a subset of offloadable tasks and a subset of non-offloadable tasks, according to technical characteristics of the calculation tasks,
identifying the tasks for which offloading is necessary, according to technical characteristics of the user terminal,
estimating, for each task of the subset of offloadable tasks, whether the offloading of the task presents an advantage according to a constraint of latency and a reduction of power associated with the offloading rather than with the calculation on the user terminal, and
determining whether the offloading can be carried out while respecting the criterion of minimization of exposure of the user to electromagnetic fields.

3. The method for offloading calculation tasks according to claim 1, wherein the measurement of radiofrequency electromagnetic dosimetry is based on:
- a transmission power established to ensure that a link between the user terminal and the edge host device is not interrupted, and
- a distance between a body of the user and an emission/reception device of the user tei niinal.

4. The method for offloading calculation tasks according to claim 3, wherein the distance between the body of the user and the emission/reception. device of the user terminal is evaluated on a basis of data provided by at least one out of a proximity sensor, an inertial measurement unit, a touch screen provided in the user terminal or by a monitoring of adaptation of impedance of various antennas provided in the user terminal.

5. The method for offloading calculation tasks according to claim 1, wherein an instantaneous value of exposure of the user to electromagnetic fields is determined.

6. The method for offloading calculation tasks according to claim 1, wherein a cumulative value over a time window of exposure of the user to electromagnetic fields is determined.

7. The method for offloading calculation tasks according to claim 1, wherein the value of exposure of the user to electromagnetic fields is calculated according to the measurement of momentary radiofrequency electromagnetic dosimetry or a cumulative dose over a time window.

8. The method for offloading calculation tasks according to claim 1, wherein the value of exposure of the user to electromagnetic fields is calculated according to the exposure to electromagnetic fields on a basis of specific exposure maps.

9. The method for offloading calculation tasks according to claim 1, wherein the value of exposure of the user to electromagnetic fields is calculated according to the sum of exposure of the user or of the identified group of people to electromagnetic fields, this exposure being caused by the user terminal or by other sources of electromagnetic fields close to the user terminal.

10. A controller comprising one or more processing circuits and one or more communication resources, the one or more processing circuits configured for offloading of calculation tasks between a user terminal and an edge host device in a communication network according to a multi-access edge computing technique, the user terminal and the edge host device being configured to:
- offload data necessary for execution of the calculation from the user terminal to the edge host device, and
- transmit data resulting from the calculation carried out by the edge host device, from the edge host device to the user terminal,
- wherein the controller is configured to be connected to at least one of the edge host device and the user terminal and to control (a) offloading of data on a basis of a criterion of energy efficiency and (b) offloading of data on a basis of a criterion of minimization of exposure of a user of the user terminal to electromagnetic fields, a value of exposure of the user to electromagnetic fields being calculated according to one or more of the following criteria:
- a measurement of momentary radiofrequency electromagnetic dosimetry or a cumulative dose over a time window,
- the exposure to electromagnetic fields on a basis of specific exposure maps, and
- a sum of exposure of the user or of an identified group of people to electromagnetic fields, this exposure being caused by the user terminal or by other sources of electromagnetic fields close to the user terminal.

11. A user terminal including a controller for offloading of calculation tasks according to claim 10.

12. A recording medium readable by a computer on which a computer program is recorded comprising instructions for execution of the steps of the method according to claim 1.

* * * * *